US008925215B2

(12) United States Patent  (10) Patent No.: US 8,925,215 B2
Drasovean  (45) Date of Patent: Jan. 6, 2015

(54) VEHICLE STEERING SHAFT CHECKING TOOL

(75) Inventor: Leon Drasovean, London (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 333 days.

(21) Appl. No.: 13/486,692

(22) Filed: Jun. 1, 2012

(65) Prior Publication Data

US 2013/0318809 A1  Dec. 5, 2013

(51) Int. Cl.
*G01B 5/14* (2006.01)

(52) U.S. Cl.
USPC .............................................. 33/701; 33/833

(58) Field of Classification Search
USPC ......... 33/701, 833, 600, 613, 645; 73/117.01, 73/117.02
See application file for complete search history.

(56) References Cited

U.S. PATENT DOCUMENTS

| | | | | |
|---|---|---|---|---|
| 4,229,883 A | * | 10/1980 | Kobashi | 33/784 |
| 4,367,592 A | * | 1/1983 | Thompson | 33/542 |
| 4,397,092 A | | 8/1983 | Marcyan | |
| 4,606,129 A | | 8/1986 | Barrowman | |
| 4,610,090 A | | 9/1986 | Brady | |
| 4,640,014 A | | 2/1987 | Thomas | |
| 4,761,887 A | * | 8/1988 | Brown et al. | 33/702 |
| 5,010,658 A | | 4/1991 | Griffith et al. | |
| 5,430,954 A | * | 7/1995 | Best et al. | 33/793 |
| 5,454,175 A | | 10/1995 | Li | |
| 5,657,545 A | * | 8/1997 | Haworth et al. | 33/600 |
| 6,003,237 A | * | 12/1999 | Sarr et al. | 33/542 |
| 6,055,853 A | * | 5/2000 | Roberts et al. | 73/117.02 |
| 6,159,074 A | * | 12/2000 | Kube et al. | 33/555 |
| 6,308,429 B1 | | 10/2001 | Green et al. | |
| 6,505,414 B2 | * | 1/2003 | Fujikawa | 33/813 |
| 6,508,009 B1 | * | 1/2003 | Tubis et al. | 33/549 |
| 6,766,583 B2 | * | 7/2004 | Economaki | 33/534 |
| 6,813,843 B1 | * | 11/2004 | Faubion | 33/638 |
| 6,829,839 B2 | * | 12/2004 | Killough | 33/784 |
| 6,834,439 B2 | * | 12/2004 | Matsumiya et al. | 33/706 |
| 7,093,373 B2 | * | 8/2006 | Sugai et al. | 33/792 |
| 7,246,450 B1 | * | 7/2007 | Mason | 33/784 |
| 7,367,984 B2 | | 5/2008 | Kulcinski et al. | |
| 7,685,735 B2 | * | 3/2010 | Kim | 33/784 |
| 7,992,311 B2 | * | 8/2011 | Cerwin | 33/286 |
| 8,141,263 B2 | * | 3/2012 | Huang | 33/544 |
| 8,297,116 B2 | * | 10/2012 | Sun | 73/117.02 |
| 8,375,779 B2 | * | 2/2013 | Pattok et al. | 73/117.02 |
| 8,739,428 B2 | * | 6/2014 | Emtman | 33/815 |
| 2002/0000118 A1 | * | 1/2002 | Panizzolo | 73/118.1 |

(Continued)

*Primary Examiner* — Yaritza Guadalupe-McCall
(74) *Attorney, Agent, or Firm* — Christopher G. Darrow; Young Basile Hanlon & MacFarlane P.C.

(57) ABSTRACT

A tool is used to determine whether or not a dimension between two surface features on two joined work pieces is within an acceptable range. The tool includes housing, first and second supports carried on the housing and carrying fingers which engage the surface features in a dimensional measurement position. An actuator and linkage displaces the supports relative to each other to bring the fingers into engagement with the first and second surface features on the work pieces. A first sensor is carried on the housing for measuring the dimension between the first and second fingers when the first and second supports are fully displaced relative to each other. The first sensor sends a dimensional measurement signal to a controller which compares the measurement signal with predetermined acceptable and non-acceptable dimensions.

16 Claims, 8 Drawing Sheets

(56) References Cited

U.S. PATENT DOCUMENTS

| | | | |
|---|---|---|---|
| 2003/0051361 A1* | 3/2003 | Economaki | 33/534 |
| 2004/0020069 A1* | 2/2004 | Killough | 33/783 |
| 2004/0221466 A1* | 11/2004 | Faubion | 33/645 |
| 2005/0109089 A1* | 5/2005 | Nagaoka et al. | 73/118.1 |
| 2008/0184582 A1* | 8/2008 | Kim | 33/784 |
| 2011/0271541 A1* | 11/2011 | Huang | 33/827 |
| 2013/0067760 A1* | 3/2013 | Husted | 33/784 |
| 2013/0318809 A1* | 12/2013 | Drasovean | 33/701 |
| 2013/0319100 A1* | 12/2013 | Kichise | 73/117.02 |
| 2014/0007446 A1* | 1/2014 | Emtman | 33/815 |
| 2014/0101955 A1* | 4/2014 | Auer et al. | 33/703 |

\* cited by examiner

VEHICLE STEERING SHAFT CHECKING TOOL

BACKGROUND

The present invention relates, in general, to measuring tools and, more particularly, to measuring tools used to check the correct assembled position of vehicle components.

Many articles of manufacture are formed as an assembly of a number of individual components. The larger the number of components required for a particular article in manufacture, the greater the complexity of the assembly operation and the higher the possibility of assembly errors.

To insure quality of assembly and reliability in long term use of a particular article, particularly an automotive vehicle where quality assembly is essential to safe operation of the vehicle, checking or measuring tools have been developed to check the proper assembled position of various components relative to each other or to an established reference value, such as a reference dimension.

In an automotive vehicle, the steering column, which carries the steering wheel, is connected during vehicle assembly to an intermediate steering shaft which is coupled to the wheel steering linkage. To insure proper vehicle steering operation, it is essential that the two steering column shafts be connected in the proper dimensional relationship.

It is possible during automotive vehicle assembly, where each work station has only a limited amount of time to complete an assembly operation, for the steering column shaft and the intermediate shaft to not be connected at all or for the two shafts to be connected, but not fully interconnected into the proper dimensional relationship.

As the interconnection position of the steering shaft and the intermediate shaft is located within the vehicle compartment underneath the instrument panel, it is difficult for an operator to easily ascertain that the two shafts are connected or to easily determine that the two shafts are fully interconnected in a proper dimensional relationship.

Thus, it would be desirable to provide a vehicle steering shaft checking tool which provides easy operation and which can determine that a vehicle steering column shaft and steering intermediate shaft are fully interconnected in the proper dimensional relationship.

SUMMARY

A tool is disclosed for determining that a dimensional measurement between two surface features on two joined work pieces is within an acceptable dimensional range. The tool includes a housing, first and second supports carried on the housing and exhibiting relative movement between each other, each of the first and second supports having a work piece engaging portion or finger for respectively adapted engaging the two surface features on the two joined work pieces, an actuator carried on the housing, and engaged with at least one of the first and second supports, for displacing the first and second supports relative to each other to bring the fingers on the first and second supports into respective engagement with the first and second surface features on the first and second joined work pieces; and a first sensor, carried on the housing, for measuring the dimension between surfaces on the first and second work piece engaging members when the first and second fingers are fully displaced relative to each other in engagement with the first and second surface features on the work pieces.

In one aspect, the housing includes a pistol grip.

In another aspect, the first sensor is a linear encoder.

In one aspect, a second sensor is carried on the housing and adapted for detecting engagement of one of the first and second supports with one of the first and second fingers in a proper positioning of the housing related to the first and second work pieces.

In one aspect, the second support moves relative to the first support which is stationarily carried on the housing. In this aspect, a first biasing means is disposed between the first and second supports for normally biasing in the second support to a normal position spaced from the first support.

In addition, a first linear bearing is carried on one of the first or second supports. A shaft, carried on the other of the first and second supports, slidably engages the first linear bearing. The shaft and the first linear bearing define an axis of movement of the second support relative to the first support. A first biasing means is disposed about the shaft between first and second supports.

A linkage is coupled to the second support for moving the second support in a direction about the axis of movement in response to a manually movable actuator carried on the housing and engaged with the linkage.

In one aspect, a depressable trigger is carried on the housing to activate the first sensor to take the dimensional measurement.

In one aspect, a first light is carried on the housing and actuated when the tool is in the proper position to take a dimensional measurement as detected by the second sensor.

A second light may also be carried on the housing and, when actuated, provides an indication that an acceptable dimensional measurement has been determined.

In another aspect, a method is disclosed for a method for determining the proper dimension interconnection of a vehicle steering column shaft having a first surface feature and an intermediate steering shaft having a second surface feature. The method includes interconnecting the first steering column shaft and the intermediate shaft, advancing a tool having first and second fingers carried on supports movably disposed relative to each other toward the interconnected shafts, displacing the first and second fingers into respective engagement with the first and second surface features on the joined work pieces, taking a dimensional measurement between the first and second fingers, comparing the taken dimensional measurement with a predetermined acceptable dimensional measurement, providing an indication of an acceptable or non-acceptable dimensional measurement, and, upon taking an acceptable measurement, removing the tool from the joined steering column shaft and the intermediate shaft.

In the method before the step of displacing the first and second fingers relative to each other, detecting the proper position of the tool relative to the joined steering column shaft and the intermediate shaft.

BRIEF DESCRIPTION OF THE DRAWINGS

The various features, advantages and other uses of the present steering shaft checking tool will become more apparent by referring to the following detailed description and drawing in which.

DETAILED DESCRIPTION

Figure 1:
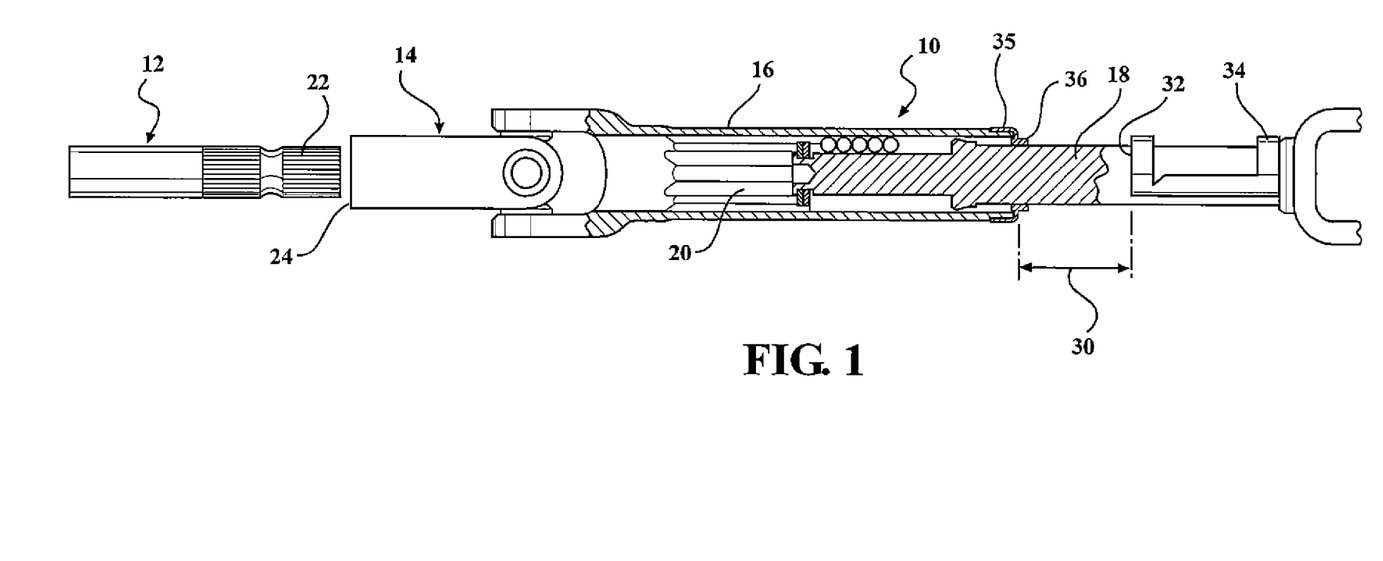
FIG. 1 is exploded, partially cross-sectioned, side elevational view of an automotive vehicle steering column shaft clamp assembly and an intermediate steering rack shaft depicted in a pre-assembled position.

Referring to FIG. 1, there is depicted an example of portion of automotive vehicle steering assembly which includes a steering shaft column clamp assembly 10, "hereafter the steering shaft", which is slidably connected to and then fixed by a fastener to an intermediate steering shaft 12, hereafter "the intermediate shaft". The steering shaft 10 is ultimately connected to the vehicle steering wheel, not shown. The intermediate shaft 12 is ultimately interconnected to the vehicle steering linkage, also not shown.

The steering shaft 10 has a yoke end portion 14 which is connected to a sleeve 16. The sleeve 16 slidably surrounds a shaft 18 which extends to an interconnection with the vehicle steering wheel, not shown. Splines 20 are formed within the sleeve 16 and interconnect with mating splines carried on the end of shaft 18 to provide sliding movement of the sleeve 16, and the yoke the 14 over the shaft 18 as the yoke 14 is telescopingly engaged with the intermediate shaft 12.

As shown in FIG. 1, the intermediate shaft 12 also has splines 22 at one end which engage mating splines, not shown, formed within a hollow bore extending from one end 24 of the yoke 14.

In a complete, normal assembly, the yoke 14 of the steering column shaft assembly 10 is inserted over the splines 22 on the intermediate shaft 12 until the yoke 14 is fully seated on the intermediate shaft 12, with no splines 22 being visible. During the assembly of the yoke 14 to the intermediate shaft 12, the sleeve 16 slides in the telescopingly engagement movement of the yoke 14 over the splines 22 on the intermediate shaft 12. This sliding movement of the sleeve 16 changes a critical gap denoted by reference number 30 between two surface features on the steering shaft 10. The two surface features include, for example, a first surface feature which is an edge 32 of a spacer 34 mounted on the shaft 18, and a second surface feature which is a two-step profile 36 on a dust cap 35 mounted on one end of the movable sleeve 16.

As described above, during the assembly of the yoke 14 to the shaft 12, the critical distance 30 changes and will have a specific value or range of values once the yoke 14 of the steering column shaft assembly 10 is fully seated and mounted over the splines 22 on one end of the intermediate shaft 12.

During the interconnection of the steering shaft 10 to the intermediate shaft 12, three possible states exist. The first state is a complete non-interconnection of the yoke 14 of the steering shaft 10 to the intermediate shaft 12. The second state is a partial interconnection of the yoke 14 to the intermediate shaft 12, where the splines 22 on the intermediate shaft 12 engage the internal splines on the end of the yoke 14, but the yoke 14 is not fully seated over the end of the intermediate shaft 12. The third state is the fully interconnected, nominal state of the yoke 14 relative to the intermediate shaft 12.

The first state yields a critical dimension 30 greater than a predetermined acceptable dimension, or upper end of a range of acceptable dimensions, such as 33.5 mm, for example. The second partially interconnected state could yield a critical dimension 30 of less than the predetermined acceptable dimension or lower than end of a range of acceptable dimensions, such as less than 26.5 mm. The third, proper state could yield a critical dimension 30 equaling the predetermined acceptable dimension or having an acceptable measurement range between 26.5 to 33.5 mm, for example. The first and second states are no go or not assembled states. Only the third state represents a fully assembled, quality interconnection meeting predetermined acceptable dimensions.

However, in a typical vehicle assembly process, where the interconnection of the steering shaft 10 to the intermediate shaft 12 takes place in a single work station, measurement of the critical distance 30 is difficult due to the location of the critical distance underneath the instrument panel within the interior vehicle as well as the limited amount of available time during a single assembly operation at the work station.

The subsequently described steering shaft checking tool 40 is configured for easily measuring the critical distance 30 and providing a go, no go or acceptable/non-acceptable signal to the work station operator as well as to the overall assembly line quality control system.

Figure 2A:
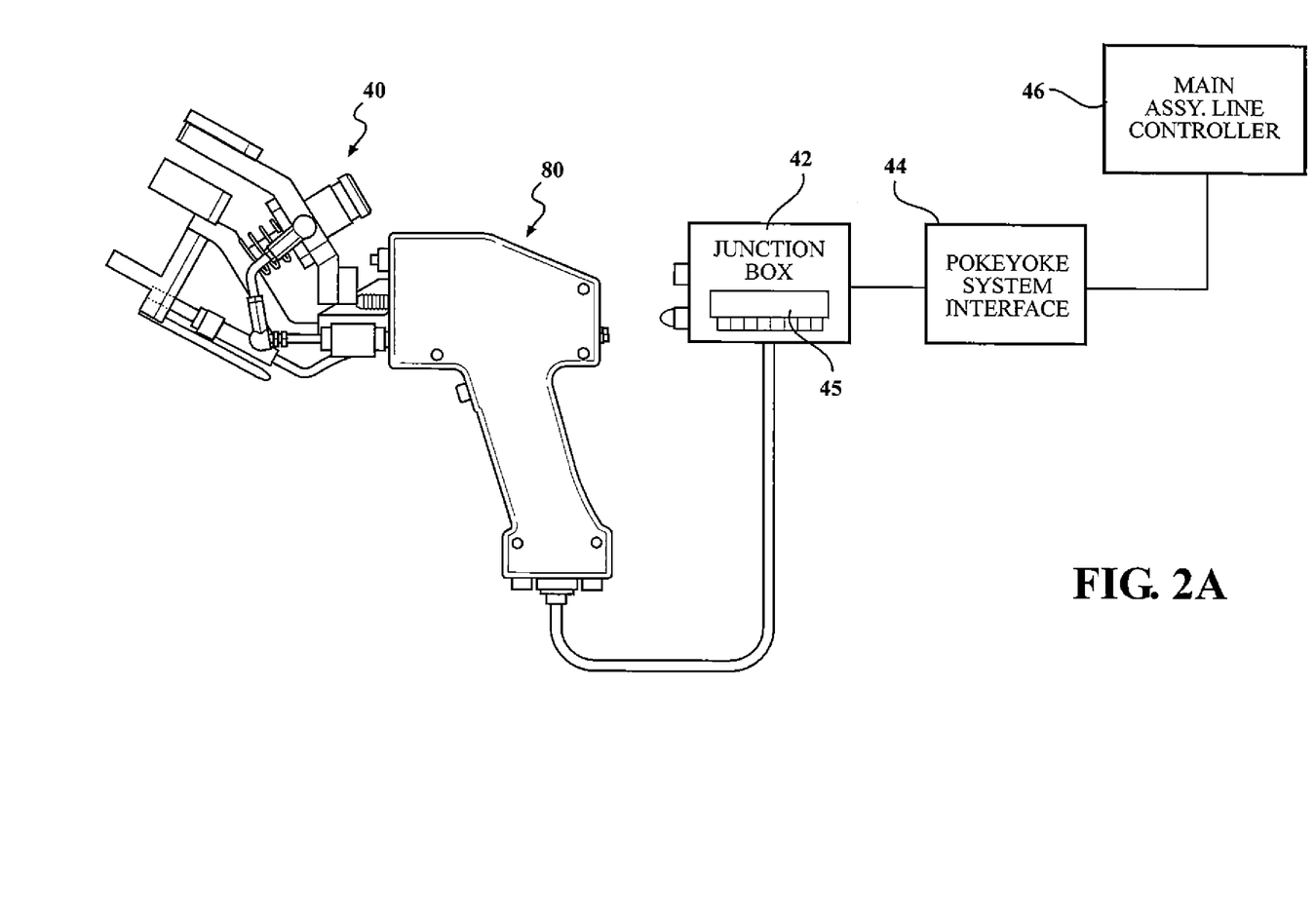
FIG. 2A is a block diagram and pictorial representation of the steering shaft checking tool and interconnected controls.

As shown in pictorially in FIG. 2A, the checking tool 40 is electrically connected to a controller in a junction box which acts as an interface between the checking tool 40 and a quality controller 44. The controller 44 can be connected to the main assembly controller 46 to provide a record of go, no go conditions generated by the checking tool 40 as to provide control signals to advance the vehicle to the next work station or to simply record that an acceptable, quality steering shaft 10 to intermediate shaft 12 assembly has been achieved.

Figures 2B, 2C:
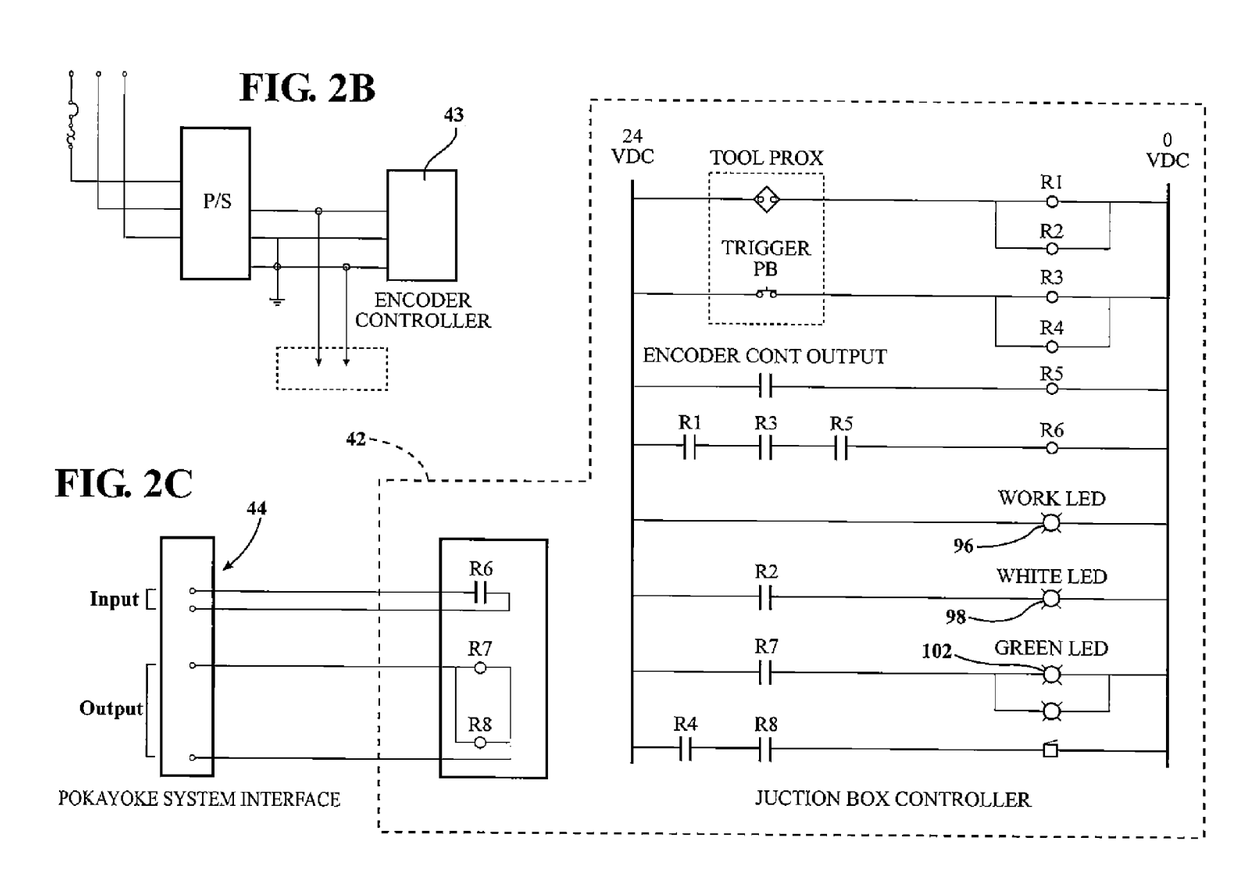
FIG. 2B is a schematic diagram of the power conversion circuit for the encoder controls and the junction box depicted in FIG. 2A.
FIG. 2C is a schematic diagram of the controls and connections within the junction box and the Pokeyoke System Interface shown in FIG. 2A.

FIGS. 2B, and 2C depict the components mounted within the junction box 42 and the interconnection signals between the junction box 42 and the interface 44. The operation and function of the various components shown schematically in FIGS. 2B and 2C will be described hereafter in conjunction with the operation of the checking tool 40.

Figure 3:
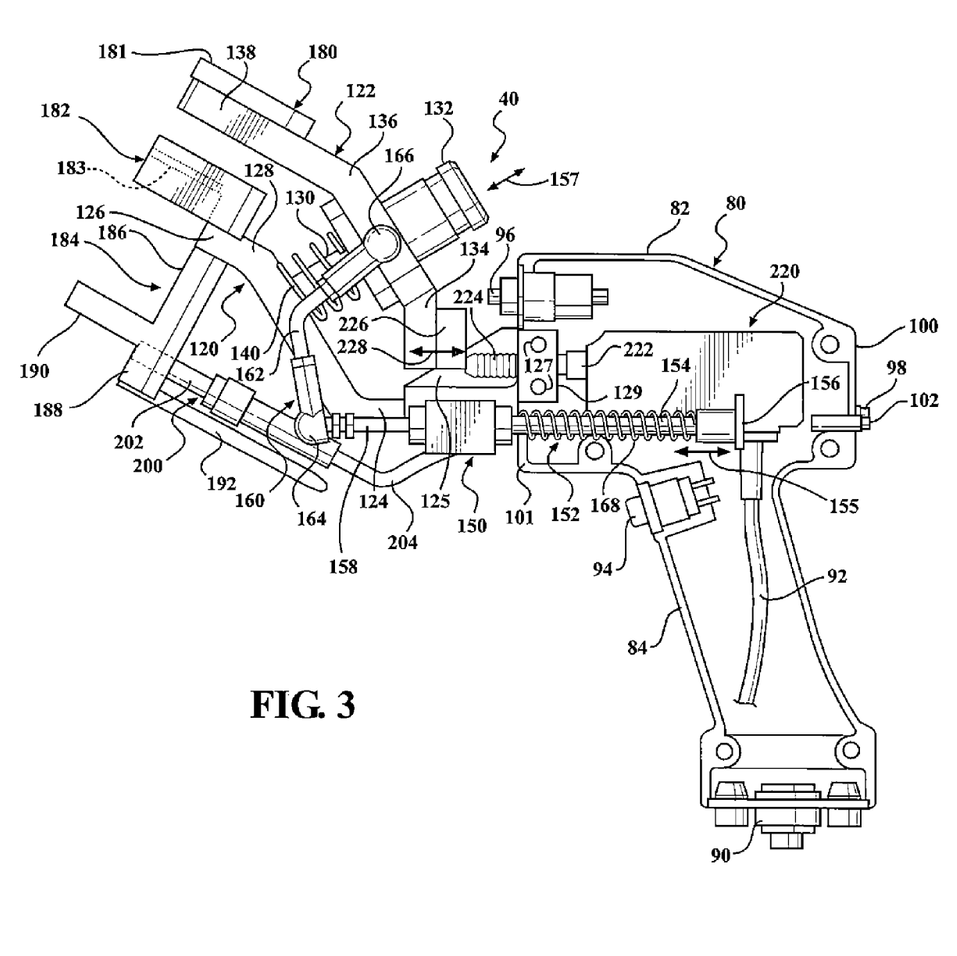
FIG. 3 is a partially broken away, left side elevational view of the steering shaft checking tool shown in FIG. 2A depicted in its nominal pre-use position.

As shown in FIG. 3, the checking tool 40 includes housing or housing 80 which supports the operative components or the checking tool 40. The housing 80, which may take any shape, is depicted by way of example only, in the form of a pistol having a head 82 and a pistol grip 84.

The housing 80 can be formed, by example, of two mating halves or sections which can be removably and fixedly joined together. The two housing portions or sections are substantially hollow and contain the electrical components of the checking tool 40 as well as supporting the mechanical components of the checking tool 40.

One or more grommets 90 are mounted in the bottom edge of the pistol grip 84 to provide a path for electrical cables or conductors, such as a single electrical cable 92 shown in FIG. 3, from connections to the electrical components contained within the housing 80 to the external controller 42. In this manner, the power is supplied from the controller 42 to the electrical components mounted within the housing 80 as well as to receive output signals from a sensor and a trigger switch mounted to the housing 80, as described hereafter.

By way of example only, the electrical components mounted within the housing 80 include a trigger 94, which outputs an electrical signal when depressed by the operator at an appropriate point in the sequence of operation of the checking tool 40, as described in greater detail hereafter, and activates the measurement taking function of the checking tool 40. A plurality of illumination devices, such as LEDs, are also mounted on the housing 80 and supplied with power from the controller 42 for general illumination in the case of a white LED 96 mounted on the front edge of the housing 80 as well as a white LED 98 on a rear edge 100 of the housing 80 which denotes to the checking tool operator that the checking tool 40 is in proper position relative to the steering column assembly 10 to take a measurement. Another LED 102, which may be a green LED by example only, is also provided on the rear edge 100 of the housing 80. The LED 102 indicates, when activated, that the measurement obtained by the checking tool 40 is within an acceptable range and that the acceptable signal has been sent to the controller 42.

As shown in FIGS. 3-7, a pair of work piece engaging member supports, including a first or lower support 120 and a second or upper support 122 are carried on the housing 80 in a movable relationship with respect to each other.

It will be understood that the terms "lower" and "upper" to define the first and second supports 120 and 122 are in relationship to the normal vertical orientation of the housing 80 when the supports 120 and 122 are brought into proximity with the steering shafts 10 and intermediate shaft 12.

The first work piece engaging member 120, hereafter referred to as the "first support", for convenience only, has a linear first end portion 124, an opposed linear second end portion 126 and an intermediate angled portion 128. The first end portion 124 is fixedly mounted to the housing by a bracket 125 which is secured by fasteners, for example, to the first end portion 124 of the first support 120. The bracket 125 terminates in a flange which is fixed to the housing 80 by fasteners, not shown, which extend through apertures in at least one side of the head portion of the housing 80 into bores 127 carried in the end of the flange of the bracket 125 and in an adjoining mating block 129.

The first end portion 124 extends linearly outward from a forward end 101 of the housing 80. The intermediate portion 128 extends angularly upward, in orientation of the housing 80 shown in FIG. 3, before transitioning into the angularly disposed second linear end portion 126.

A generally cylindrical shaft 130 extends angularly or perpendicularly from one side of the intermediate portion 128 of the first support 120. One end of the shaft 130 slidably and telescopingly engages the interior of a linear bearing 132 which is fixedly mounted on the second support 122.

The second support 122 is in the form of a unitary member, for example, having a first end portion 134, an intermediate portion 136 and a second end portion 138. The first and second end portions 134 and 138 extend angularly from the intermediate portion 136. The intermediate portion 136, which carries the first linear bearing 132, is generally disposed in parallel to the intermediate portion 128 of the first support 120 when the first and second supports 120 and 122 are in their normal, pre or non-use position, depicted in FIG. 3. A biasing means, such as a coil spring 140, is seated between the intermediate portions 128 and 136 of the first and second supports 120 and 122, respectively, to normally bias the second support 122 to its normal pre or non-use position shown in FIG. 3, spaced from the stationary first support 120.

It will be understood that both of the first and second supports 120 and 122 can each be configured for movement from a normal pre or non-use position to a use position, instead of having only the second support 122 move relative to the stationary first support 120 when the checking tool 40 is activated to its use or measuring position.

A second linear bearing 150 is fixedly mounted to a side edge of the first end portion 124 of the first support 120 in front of and to the side of the forward edge 101 of the housing 80. The second linear bearing 150 slidably receives an elongated shaft 152 which forms part of an actuator or activating mechanism for displacing the first and second supports 120 and 122 relative to each other. The shaft 152 has a first end 154 extending outward from one end of the second linear bearing 150 and terminating in a pad 156. A second end 158 of the shaft 152 extends outward from the other end of the second linear bearing 150 and is coupled to a linkage 160. A biasing means, such a coil spring 168, is mounted about the portion of the shaft 152 and is seated between the first end of the second linear bearing 150 and the pad 156 to normally bias the shaft 152 to a normal first, non-activated position shown in FIG. 3.

The linkage 160 in the form of an angled bar 162 having a first end configured as a receiver for attachment to the second end 158 and the shaft 152. A second end 166 of the linkage 160 is fixedly attached to a side surface of the intermediate portion 136 of the second support 122.

The portion of the shaft 152 extending between the first end of the second linear bearing 150 and the pad 156 extends along the side of the head 82 of the housing 80 so as to position the pad 156 in a convenient position for engagement with an operator's thumb when the operator's hand is wrapped around the pistol grip 84 of the housing 80. A forward push movement by the operator's thumbs on the pad 156 moves the shaft 152 through the second linear bearing 150. This forward extension movement, relative to the forward edge 101 of the housing 80, as indicated by arrow 155 moves the first end 164 of the linkage 160 in a linear direction away from the front edge of the housing 80. This forward movement is translated by the linkage 160 to a linear movement of the second end 166 of the linkage 160 along the axis of the shaft 130 and the coaxial axis of the shaft 130 in the first linear bearing 132. This causes the intermediate portion 136 of the second support 122 to move in a generally parallel direction toward the intermediate portion 128 of the first support 120 and moves the second end portion 138 of the second support 122 toward the second end portion 126 of the first support 120 in the direction of arrow 157.

This movement of the second support 122 along the axes of the shaft 138 and the first linear bearing 132 causes a generally linear or horizontal movement of the first end portion 134 of the second support 122 relative to the front edge 101 of the housing 80.

Release of the user's thumb from the pad 156 allows the spring 168 to bias the shaft 152 back to its normal, non-use position shown in FIG. 3 for the next work cycle.

Fingers or work piece engaging members are formed of a material, such as nylon, for example only, which will not mar or disfigure the portions of the steering column shafts 10, 12 which they engage.

Figures 5, 6:
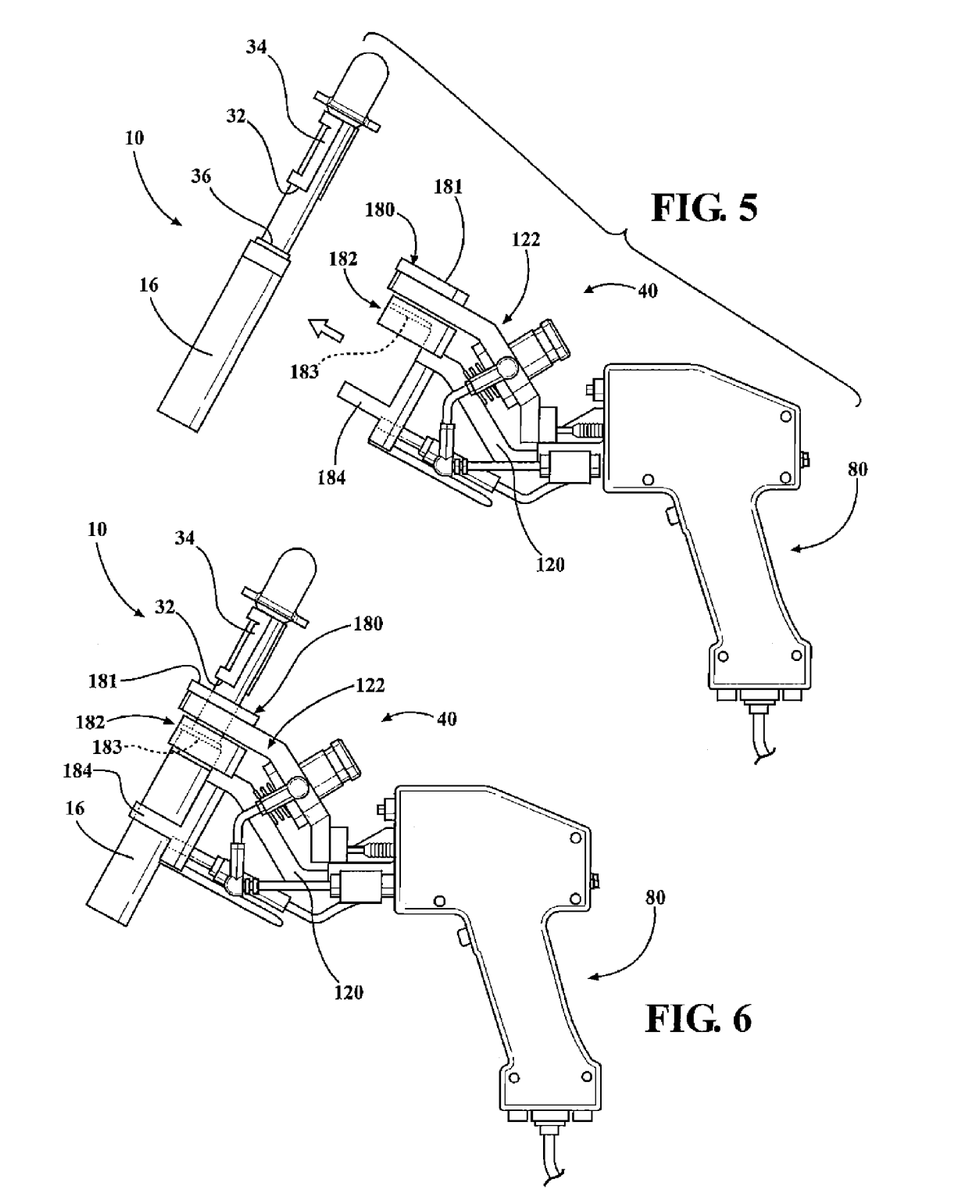
FIG. 5 is a side elevational view, similar to FIG. 3, but depicting the steering shaft checking tool in its pre-measuring position with respect to the assembled steering shaft and intermediate shaft.
FIG. 6 is a side elevational view, similar to FIG. 5, showing the engagement checking tool with the assembled steering shaft and intermediate shaft.

By example only, a first finger 180 in the form of a U-shaped member is fixedly mounted by adhesive, fasteners, etc., to an outer surface of the first end portion 132 of the second support 122. A second generally U-shaped finger 182 is similarly mounted on an outer edge of the second end portion 126 of the first support 120. The interior end of the second finger 182 includes a two-step profile which is complimentary of the profile 36 on the dust cover 35 for seating the second finger interior profile 183 on the dust cap profile 36 forming the second surface feature, as shown in FIG. 6.

A third finger 184 has a first linear portion 186 fixedly attached by adhesive or fasteners to an opposite edge of the second end portion 126 of the first support 120 from the second finger 182. The linear portion 186 of the third finger 184 terminates in an end portion 188. The intermediate ends of the third finger 184 form a generally U-shaped work piece engaging member 190 including a pair of spaced legs defining an open ended slot. The legs are spaced apart in distance to engage the outer diameter of the sleeve 16 on the steering column shaft assembly 10, shown in FIG. 1, to locate the entire checking tool 40 in the proper position relative to the steering shaft 10.

Figure 4:
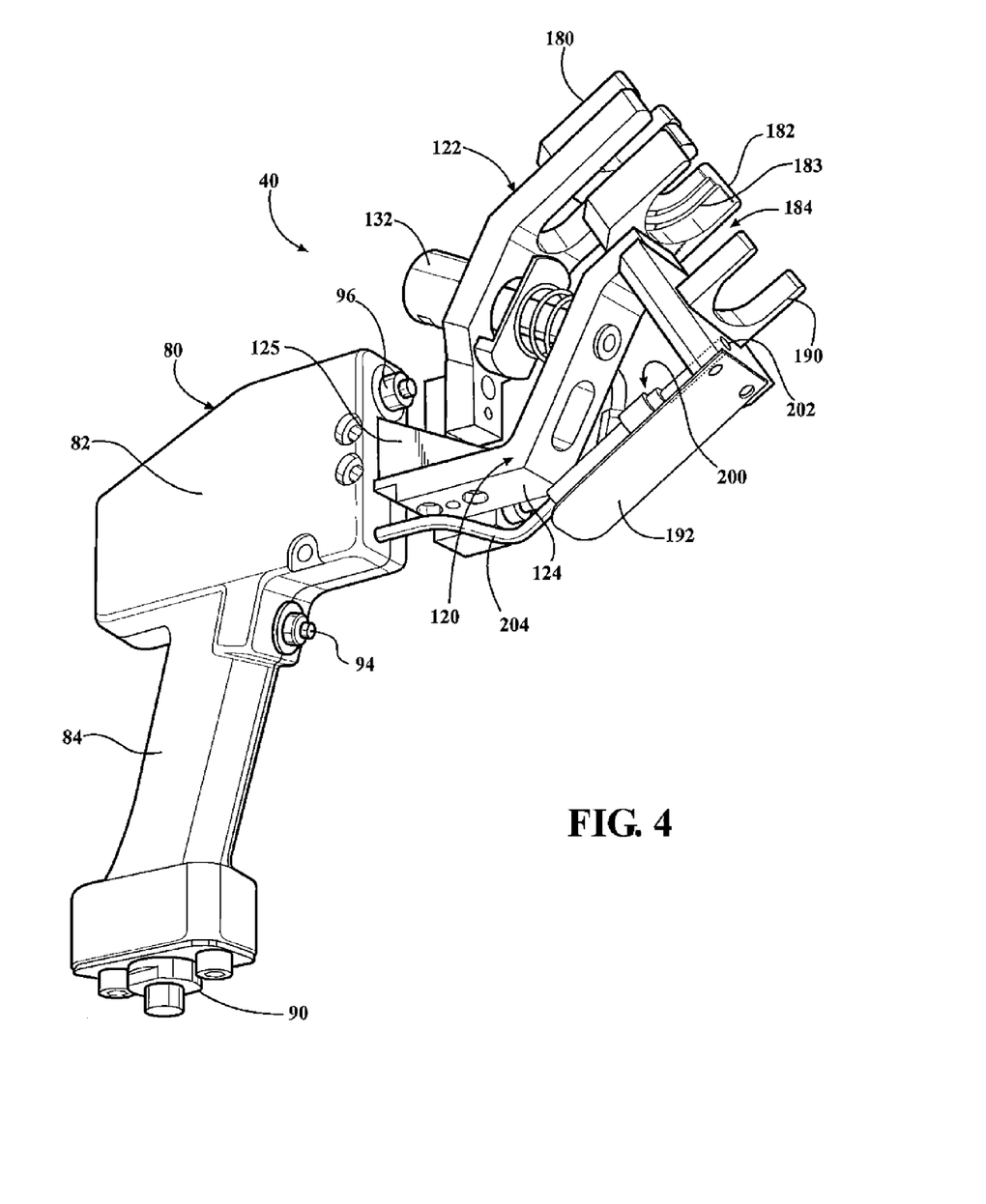
FIG. 4 is a right side perspective view of the steering shaft checking tool depicted in its nominal pre-use position.

Referring back to FIG. 3, an elongated, generally planar shield 192 is fixed to the end portion 188 of the third finger 184 and projects perpendicularly away from the third finger 184 toward the pistol grip 84 of the housing 80. The shield 192 protects a first position sensor 200, generally in the form of a proximity switch. The proximity switch 200 has an end or probe portion 202 which projects through a bore formed in the end portion 188 of the third finger 184 and terminates generally flush with the inner surface of the end portion 188 below the third finger 184. The body of the proximity switch 200, see FIG. 4, is held in position by the end portion 188 of the third finger 184. A conductor 204 extends from the body of the proximity switch 200 through the housing 80 and the cable 92 to the junction box 42.

A linear encoder 220 is mounted within the housing 80. The linear encoder includes a movable shaft 222 which terminates in an end 224 covered by a protective sleeve. The end 224 of the linear encoder shaft 222 is positioned to engage a block 226 mounted on the first end portion 134 of the second support 122.

The block 226 moves in a generally horizontal direction, generally perpendicular to the front edge 101 of the housing 80 in the direction of arrow 228 shown in FIG. 3 with movement of the second support 122 relative to the first support 120, as described above. This horizontal bi-directional movement at the block 226 and the second end 134 of the second support 122 causes extension or retraction of the linear encoder shaft 222 which is converted by the linear encoder 220 to a signal corresponding to a distance measurement. This distance measurement is transmitted as an electrical signal through the cable 92 to the controller 43 in the junction box 42. The controller 43 compares the distance measurement with a predefined acceptable or "go" distance measurement or a range of acceptable measurements as described above.

The controller 43 allows the predetermined acceptable dimension or dimensional range to be set up via push buttons on the controller display 45 mounted on the exterior surface of the junction box 42. The controller 43 also generates display signals relating to the current measurement in numerical form on the display 45.

The operation of the checking tool 40 in conjunction with the controller 42 and the quality control system 44 to determine if the assembled position of the steering shaft 10 and the intermediate shaft 12 is within an acceptable range will now be described in conjunction with FIGS. 4-8.

In use, the checking tool 40 will first be in the nominal non-use position shown in FIG. 3 in which the second support 122 is spaced from the second protective work piece engaging member 182 mounted on the end of the first support 120.

Next, in step 300, the operator engages his thumb with the pad 156 on the shaft 152 extending alongside of the housing 80 and advances the shaft 152 in a forward direction relative to the housing 80.

Extension of the end 158 of the shaft 152 relative to the second linear bearing 150 extends the first end 164 of the linkage 160 in the same direction and pulls the second end 166 of the linkage 160 along the co-axial axes of the shaft 138 and the first linear bearing 132 pulling the second support 122 toward the first support 120 until the second end portion 138 of the second support 122 is disposed in close proximity to or contact with the second finger 182, as shown in FIG. 5.

In step 302, the operator then advances the housing 80 toward the joined steering shaft 10 and intermediate shaft 12 and brings U-shaped member 190 of the third finger 184 into engagement with the larger diameter sleeve 16. At the same time, the operator slides the first and second fingers 180 and 182, which also have U-shaped slots, in between the end profile 35 of the dust cap 36 on the sleeve 16 and the end 32 of the spacer 34 on the steering shaft 10.

The end 202 of the proximity switch 200 will then be immediately adjacent to the sleeve 16 to detect that the checking tool 40 is in the correct position for taking a measurement in step 304.

If the proximity switch 200 does not detect the immediate proximity of the sleeve 16 thereby indicating that the housing 80 of the checking tool 40 is not in the proper position and orientation relative to the steering shaft 10 and the intermediate shaft 12, the operator will not see any activation of the "tool in position" light 98 on the housing 80. The operator can then reposition the housing 80 until the housing 80 is in the proper position and the light 98 is activated in step 306.

The output signal from the proximity switch 200 is transmitted through the cable 204 and the cable 92 in the housing 80 to the controller 42. The controller 42 then activates the white "tool in position light" 98 on the housing 80 in step 306. This alerts the operator that the checking tool 40 is in the proper position.

Next, in step 308, the operator releases the thumb pressure on the pad 156 on the shaft 152, in step 308. Once thumb pressure is released on the shaft 152, the spring 168 moves the pad 156 and the entire shaft 152 to the right or back to its nominal, non-use position. This movement causes a similar retraction in the linkage 160 thereby moving the bottom end 164 of the linkage 160 to the right, in the orientation shown in FIG. 3 and pushing the second end 166 of the linkage 160 outward along the axis of the linear bearing 132. The biasing spring 140 is then able to bias the second support 122 away from the first support 120.

Prior to releasing the thumb pressure on the pad 156 in step 308 or after the thumb pressure has been released, the operator can slide the tool 40 downward along the joined shafts 10 and 12 until the locating surface 183 of the second finger 182 firmly engages and seats on the complimentary shaped end 36 of the dust cap 35. The outward movement of the first finger 122 will move the surface or edge 181 of the first finger 180 into engagement with the surface feature or end 32 of the spacer 34.

Figure 7:
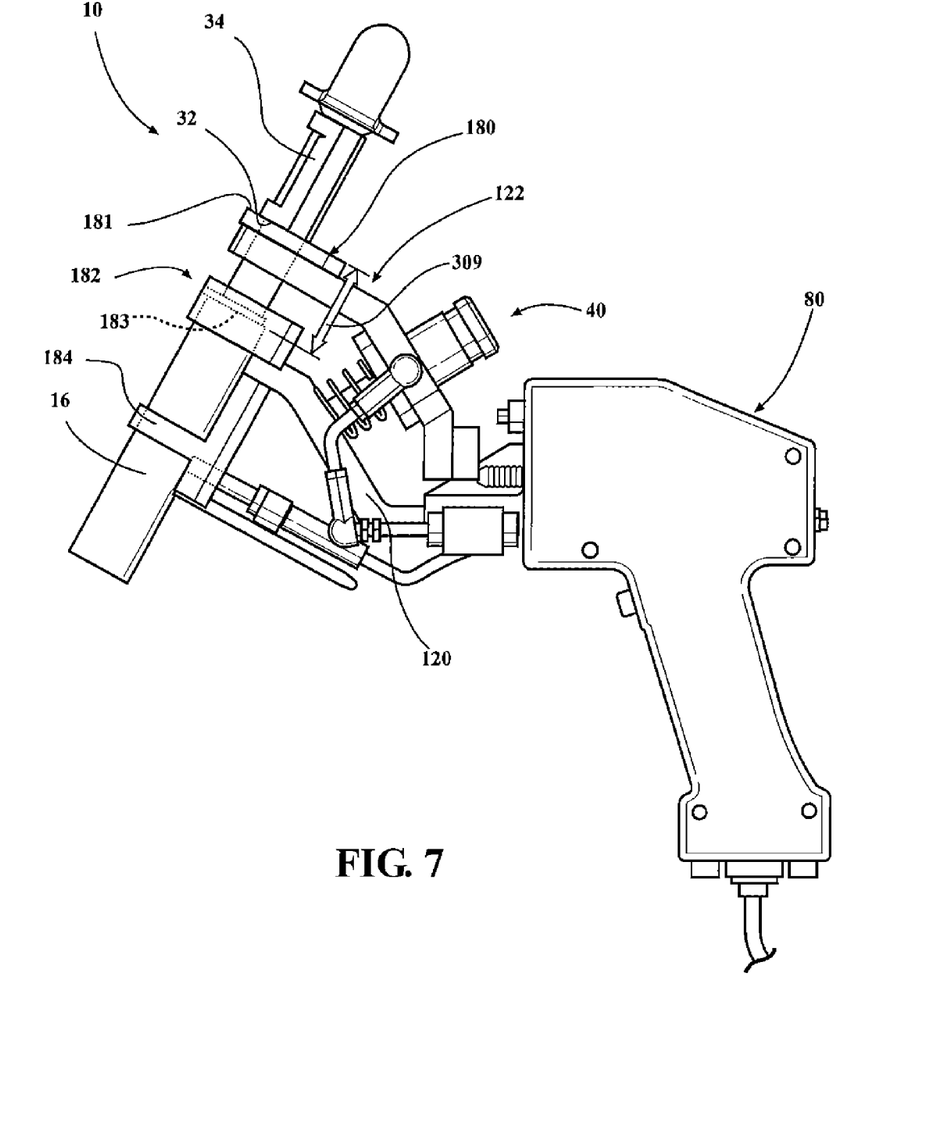
FIG. 7 is a side elevational view, similar to FIG. 6, but showing the steering shaft checking tool in its measuring condition on the assembled steering shaft and intermediate shaft.

With the the two locating surfaces 181 of the first finger 180 and the edges 183 of the second finger 182 in engagement with the mating surfaces 32 and 36 respectively, on the steering shaft 10 and the sleeve 16, the operator then depresses the trigger 94 on the pistol grip 84 in step 310 to activate the linear encoder 220 to take a measurement of the dimension 309 shown in FIG. 7, of the gap 30 between the edge 32 and the profile 36. The measurement signal from the linear encoder 220 passes through the cable 92 to the controller 43 in the interface 42, in step 312. The controller 43, in step 314, then compares the measurement signal with the predetermined or prestored acceptable or non-acceptable dimensions, as described above. If the measurement signal detected by the linear encoder 220 is within the prescribed range, in step 314, the controller 43 sends a signal through the cable 92 to activate the light 102 on the back of the housing 80, in step 316. This alerts the operator that an acceptable measurement has been taken. The operator then repeats step 300 to close the first and second supports 120 and 122 in step 318 by pushing the shaft 152 in a forward direction and then disengages the entire tool 80 from the work piece in step 320.

Figure 8:
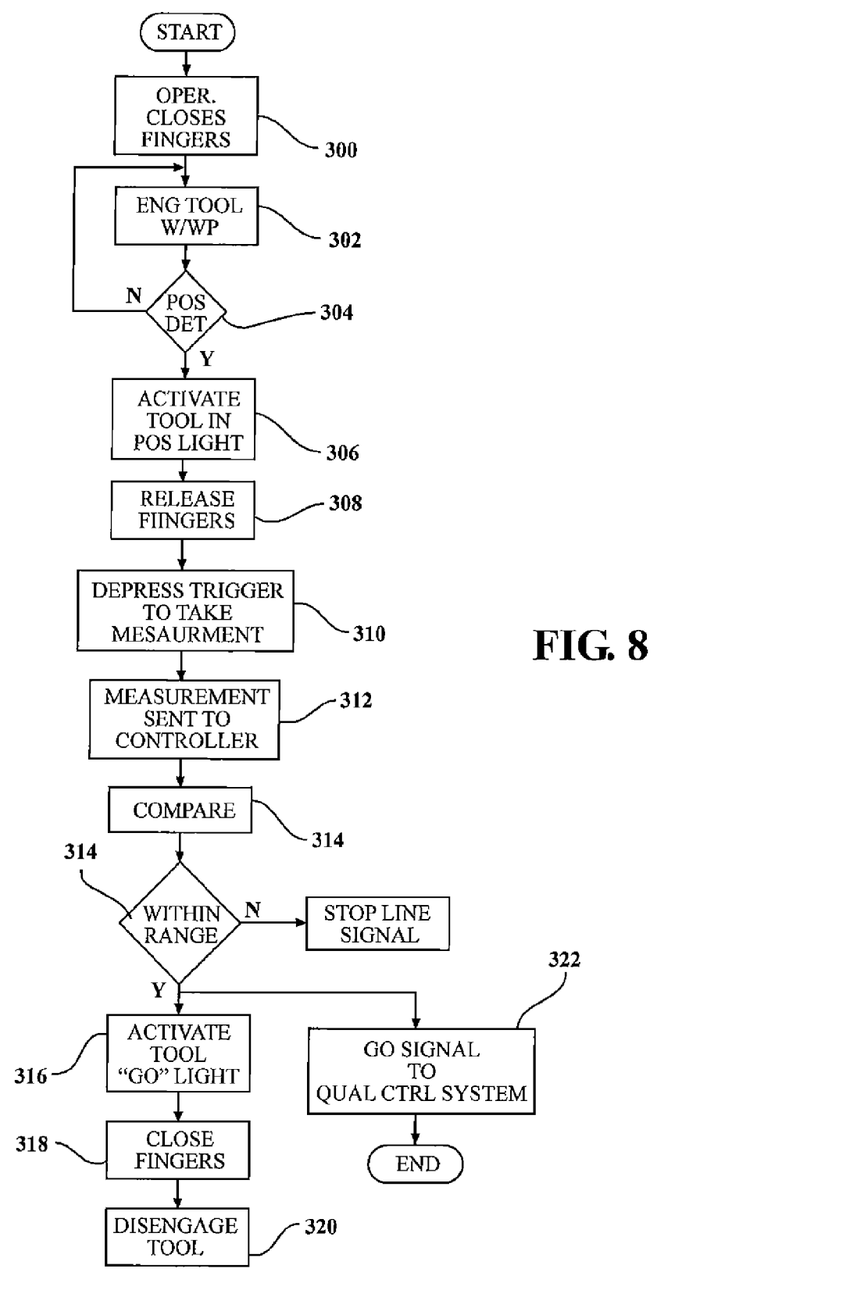
FIG. 8 is a block flow diagram showing the sequence of operation of the checking tool 40 and the control system in measuring the predetermined dimensional assembled position of two work pieces, such as the steering shaft and the intermediate shaft.

As shown in FIG. 8, when an acceptable measurement is detected by the controller 43 in the interface 42 in step 314, the controller 43 sends a signal to the assembly line quality control system 44, FIG. 2, which tells the assembly line control system that the work operation in this workstation has been successfully completed so that assembly line can advance to the next station.

If a "no go" or non-acceptable measurement signal is detected in step 314, the absence of an acceptable signal by activation of the light 102 on the housing 80 will alert the operator that a non-acceptable measurement has been detected.

The operator then initiates a first re-measurement by collapsing the first and second supports 120 and 122, repositioning the housing 80, and then releasing the supports 120 and 122 to their expanded measurement positions shown in FIG. 7.

If an acceptable measurement is then detected in step 314, steps 316-322 will take place, as described above. However, if a second "no go" or non-acceptable condition is determined in step 314, the lack of a "go" signal causes a stop assembly line signal to be generated, stopping the assembly line and allowing corrective action or a visual inspection of the steering column shaft 10 engagements with the intermediate shaft 12 to be undertaken. Various corrective actions can then be initiated or the vehicle marked for a non-acceptable steering shaft 10 to intermediate shaft 12 connections.

What is claimed is:

1. A tool for determining whether dimensional measurement between two surface features on two joined work pieces is within an acceptable dimensional range comprising:
    a housing;
    first and second supports carried on the housing and capable of exhibiting relative movement between each other;
    each of the first and second supports having a work piece engaging portion respectively adapted for engaging first and second surface features on the two joined work pieces;
    an actuator carried on the housing, and engaged with at least one of the first and second supports, the actuator, when actuated, displacing the first and second supports relative to each other to move the work piece engaging members on the first and second supports toward each other so that the work piece engaging members on the first and second supports can be inserted between the first and second surface features and, upon deactivation, the actuator moves the work piece engaging members on the first and second supports to engage the first and second surface features on the first and second joined work pieces; and
    a first sensor, carried on the housing, for measuring a dimension between the first and second work piece engaging members when the first and second work piece engaging members are in engagement with the first and second surface features on the work pieces.

2. The tool of claim 1 wherein the housing has a pistol grip.

3. The tool of claim 1 wherein the first sensor comprises:
    a linear encoder.

4. The tool of claim 1 further comprising:
    a second sensor carried on the housing, the second sensor adapted for detecting engagement of the one of the first and second supports with one of the first and second work pieces in a proper positioning of the housing relative to the first and second work pieces.

5. The tool of claim 1 wherein:
    the second support moves relative to the first support stationarily carried by the housing.

6. The tool of claim 5 further comprising:
    a first biasing means, disposed between the first and second supports, for normally biasing the second support to a normal position spaced from the first support.

7. The tool of claim 5 further comprising:
    a first linear bearing carried on one of the first and second supports;
    a shaft carried on the other of the first and second supports and slidably engaged with the first linear bearing; and
    the shaft and the first linear bearing defining a common axis of movement of the second support relative to the first support.

8. The tool of claim 7 further comprising:
    the first biasing means disposed about the shaft between the first and second supports.

9. The tool of claim 7 wherein the actuator comprises:
    a linkage coupled to the second support for moving the second support in a direction along the axis of movement; and
    a manually movable actuator, carried on the housing and engaged with the linkage, for displacing the linkage.

10. The tool of claim 1 further comprising:
    a depressable trigger carried on the housing to activate the first sensor to take the dimensional measurement.

11. The tool of claim 1 further comprising:
    a first light carried on the housing, the first light being activated when the tool is in the proper position to take a dimensional measurement as detected by the second sensor.

12. The tool of claim 1 further comprising:
    a second light carried on the housing, the second light, when actuated, indicating that an acceptable dimensional measurement has been determined.

13. The tool of claim 1 further comprising:
    a third light carried by on the housing for lighting an area in front of the housing.

14. A method for determining a proper dimension interconnection of a vehicle steering column shaft having a first surface feature and an intermediate steering shaft having a second surface feature, comprising:
    interconnecting the steering column shaft and the intermediate shaft;
    advancing a tool having first and second fingers carried on supports movably disposed relative to each other toward the interconnected shafts;
    moving the first and second fingers into respective engagement with the first and second surface features on the joined steering column shaft and the intermediate shaft;
    taking a dimensional measurement between the first and second fingers;
    comparing the taken dimensional measurement with a predetermined acceptable dimensional measurement;

providing an indication of an acceptable or non-acceptable taken dimensional measurement; and removing the tool from the joined steering column shaft and the intermediate shaft.

15. The method of claim 14 further comprising:

before the step of moving the first and second fingers into engagement with the first and second surface features, detecting the proper position of the tool relative to the joined steering column shaft and the intermediate shaft.

16. The method of claim 15 further comprising:

upon detecting a proper position of the tool, manually activating a switch on the housing to move the first and second fingers into engagement with the first and second surface features.

\* \* \* \* \*

UNITED STATES PATENT AND TRADEMARK OFFICE
CERTIFICATE OF CORRECTION

| | | |
|---|---|---|
| PATENT NO. | : 8,925,215 B2 | Page 1 of 1 |
| APPLICATION NO. | : 13/486692 | |
| DATED | : January 6, 2015 | |
| INVENTOR(S) | : Leon Drasovean | |

It is certified that error appears in the above-identified patent and that said Letters Patent is hereby corrected as shown below:

In the Specification

In Column 3, Line 24, please delete "40".
In Column 6, Line 37, please change "thumbs" to "thumb".

Signed and Sealed this
Nineteenth Day of May, 2015

Michelle K. Lee
*Director of the United States Patent and Trademark Office*